(12) United States Patent
Bernardin et al.

(10) Patent No.: US 7,865,826 B2
(45) Date of Patent: Jan. 4, 2011

(54) SYSTEM AND METHOD FOR CREATING AND PRESENTING MATHEMATICAL DOCUMENTS

(75) Inventors: Laurent Bernardin, Kitchener (CA); Paul Demarco, New Dundee (CA); Kevin Ellis, Kitchener (CA); David E. G. Hare, Waterloo (CA)

(73) Assignee: Waterloo Maple Inc., Waterloo (CA)

( * ) Notice: Subject to any disclaimer, the term of this patent is extended or adjusted under 35 U.S.C. 154(b) by 1092 days.

(21) Appl. No.: 11/434,609

(22) Filed: May 15, 2006

(65) Prior Publication Data

US 2007/0266315 A1    Nov. 15, 2007

(51) Int. Cl.
G06F 17/00    (2006.01)

(52) U.S. Cl. .................. 715/273; 715/200; 715/211; 715/267; 715/277

(58) Field of Classification Search .......... 715/200, 715/209, 219, 247, 255, 267, 268, 211, 273, 715/277

See application file for complete search history.

(56) References Cited

U.S. PATENT DOCUMENTS

| | | | | |
|---|---|---|---|---|
| 5,189,633 A | * | 2/1993 | Bonadio | 715/215 |
| 5,469,538 A | * | 11/1995 | Razdow | 715/205 |
| 5,526,475 A | * | 6/1996 | Razdow | 715/205 |
| 6,610,106 B1 | * | 8/2003 | Jenks | 715/273 |
| 7,231,593 B1 | * | 6/2007 | Raja et al. | 715/210 |
| 2002/0143730 A1 | * | 10/2002 | Bennett | 707/1 |
| 2004/0114258 A1 | * | 6/2004 | Harris et al. | 359/841 |
| 2004/0157203 A1 | * | 8/2004 | Dunk et al. | 434/350 |
| 2006/0001667 A1 | * | 1/2006 | LaViola et al. | 345/473 |

OTHER PUBLICATIONS

William A. Martin, Computer input/output of mathematical expressions, 1971, ACM New York, NY, USA, pp. 1-12.*

* cited by examiner

Primary Examiner—Chau Nguyen
(74) Attorney, Agent, or Firm—Pearne & Gordon LLP

(57) ABSTRACT

A system and method of creating and presenting mathematical documents are provided. The system comprises an input/output component for receiving user input and for displaying a mathematical document on a display device, a document repository 104 for storing the mathematical document and a mathematical engine for performing computations. The document includes markup that specifies display options. The method comprises the steps of receiving input data that represent characters, symbols and mathematical operations as well as manipulations and presentation control of the mathematical document, displaying mathematical expressions or a combination of mathematical expressions and text in an electronic document, performing computations on the mathematical expressions contained in the document, and controlling the formatting and display of the document.

14 Claims, 14 Drawing Sheets

SYSTEM AND METHOD FOR CREATING AND PRESENTING MATHEMATICAL DOCUMENTS

FIELD OF THE INVENTION

The invention relates generally to a system and method for creating and presenting electronic documents containing mathematical expressions and equations.

BACKGROUND OF THE INVENTION

There are systems for creating documents with mathematical content as well as systems for performing computations with mathematical expressions and for displaying the results of such computations. There are two basic methods of integrating such computations into a document. The first method integrates textual commands into the document that reference the mathematical algorithm that is to be applied to a mathematical expression and the result is displayed following this textual command. This method has the advantage that it is immediately obvious, from looking at the document, what algorithm was applied to an expression and how to reproduce the same operation elsewhere in the document or in a new document. The disadvantage is that the textual commands are often verbose and distract from the presentation of the document. The second method is to display the result, following the input expression and to display, between the two, a short text or symbol (e.g., an arrow) that describes the operation that was applied. This makes the document visually appealing and close to what one would expect to see in a mathematical textbook. There is no textual command or syntax that may be a distraction from the actual content that the document is supposed to convey. The disadvantage of this method is that, although the exact semantics of the operation can be preserved behind the scenes, in order to automatically update results if the input changes, the semantics of the operation are not obvious to a reader of the document. Because the presentation has to be visually appealing, the description of the operation has to be more casual or imprecise.

It is desirable to have a way of producing visually appealing documents that focus on the essential mathematical content that is to be conveyed as well as giving the reader access to the precise semantics of all the operations that are contained in the document.

SUMMARY OF THE INVENTION

A system and method of creating and presenting mathematical documents are provided. The system and method allow a user to prepare electronic documents containing mathematical expressions, with a high level of control over how the document is formatted. The mathematical expressions contained in a document are live, in the sense that changes to one part of the document can affect expressions in a different part of the document. Mathematical algorithms that transform one mathematical expression to another one are used to capture the relationships between two mathematical expressions in a document in order to update one if the other one changes. The user has control over how much detail on these mathematical algorithms to expose to a reader of the document.

In accordance with an embodiment of the invention, there is provided a system for creating and presenting mathematical documents. The system comprises an input/output component for receiving user input and for displaying a mathematical document on a display device, a document repository 104 for storing the mathematical document and a mathematical engine for performing computations. The document includes markup that specifies display options.

In accordance with another embodiment of the present invention, there is provided a method of creating and presenting mathematical documents. The method comprises the steps of receiving input data that represent characters, symbols and mathematical operations as well as manipulations and presentation control of the mathematical document, displaying mathematical expressions or a combination of mathematical expressions and text in an electronic document, performing computations on the mathematical expressions contained in the document, and controlling the formatting and display of the document.

BRIEF DESCRIPTIONS OF THE DRAWINGS

An embodiment of the invention will now be described by way of example only, with reference to the following drawings in which.

DETAILED DESCRIPTION OF THE PREFERRED EMBODIMENTS

Figure 1:
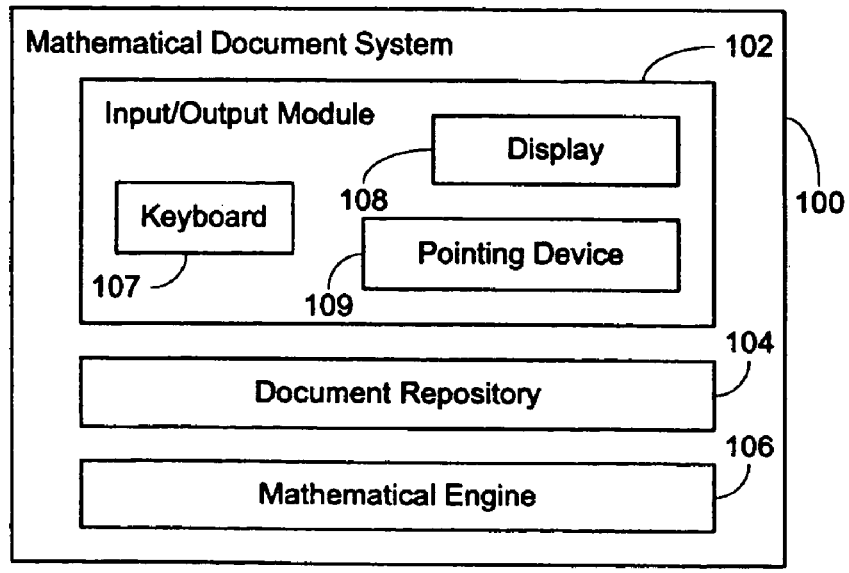
FIG. 1 shows in a component diagram an example of a mathematical document system for creating and presenting mathematical documents, in accordance with an embodiment of the present invention.

A system and method of creating and presenting mathematical documents are provided. The system and method allow a user to prepare electronic documents containing mathematical expressions, with a high level of control over how the document is formatted. The mathematical expressions contained in a document are live, in the sense that changes to one part of the document can affect expressions in a different part of the document. Mathematical algorithms that transform one mathematical expression to another one are used to capture the relationships between two mathematical expressions in a document in order to update one if the other one changes. The user has control over how much detail on these mathematical algorithms (also referred to as mathematical operations and computation as described below) to expose to a reader of the document.

A system and method of the present patent disclosure will now be described with reference to various examples of how the embodiments can best be made and used. For convenience, like reference numerals are used throughout the description and several views of the drawings to indicate like or corresponding parts, wherein the various elements are not necessarily drawn to scale.

A mathematical document is created using a word-processor like software system, which allows the combination of text with more complex content such as mathematical expressions, graphs and images. A document is a linear sequence of subcomponents including Text Paragraphs (which can contain text, two-dimensional mathematical expressions, graphs and images) and Execution Groups. An Execution Group is a linear sequence of Text Paragraphs, Input Fields and Output Fields. An Input Field can contain two-dimensional mathematical expressions mixed with linear text, all representing either a mathematical expression or an operation or algorithm to perform or both. An Output Field can contain two-dimensional mathematical expressions, linear text, graphs or a combination of these.

FIG. 1 shows in a component diagram an example of a mathematical document system 100 for creating and presenting mathematical documents, in accordance with an embodiment of the present invention. The mathematical document system 100 comprises an input/output component 102 for receiving input data and displaying a mathematical document that is created and formatted in response to the input data, a document repository 104 for storing the mathematical document and a mathematical engine 106 for performing mathematical computations. The mathematical document including markup that specifies display options. The input/output component 102 includes a display 108 for reading document markup and displaying documents having two-dimensional type-set mathematical expressions, a keyboard 107 and pointing device 109 that allows a user to input characters, symbols and mathematical operations as well as initiate manipulations of the mathematical document.

Figure 2:
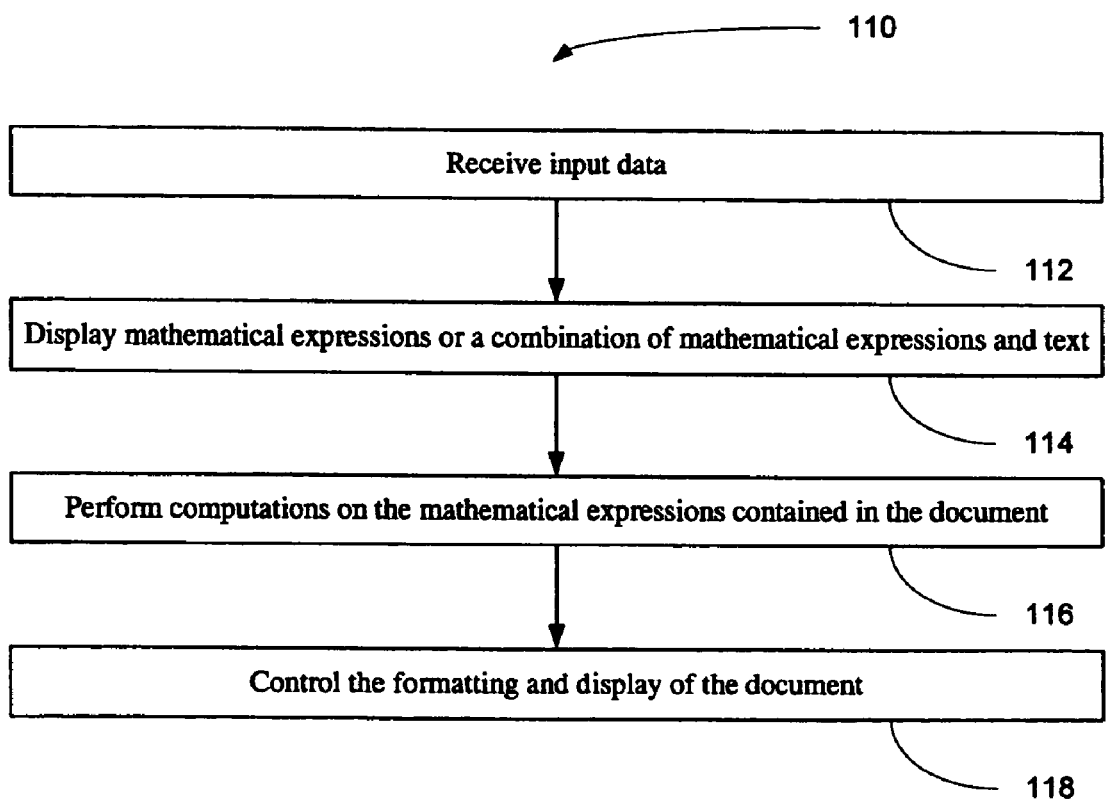
FIG. 2 shows in a flowchart an example of a method of creating and presenting mathematical documents, in accordance with an embodiment of the mathematical document system

FIG. 2 shows in a flowchart an example of a method of creating and presenting mathematical documents (110), in accordance with an embodiment of the mathematical document system 100. The method begins with receiving input data (112). The input data represent characters, symbols and mathematical operations as well as manipulations and presentation control of the mathematical document. Next, mathematical expressions or a combination of mathematical expressions and text are displayed in an electronic document (114). Computations on the mathematical expressions contained in the document are performed (116) and the formatting and display of the document is controlled (118) in order to toggle the display of the textual commands representing the operations that are performed versus hiding the commands and displaying only the input, only the output or both input and output as well as any descriptive text explicitly added by the user. In addition controlling whether input and output appears inline, within surrounding text or on a separate line may be performed.

Figure 3:
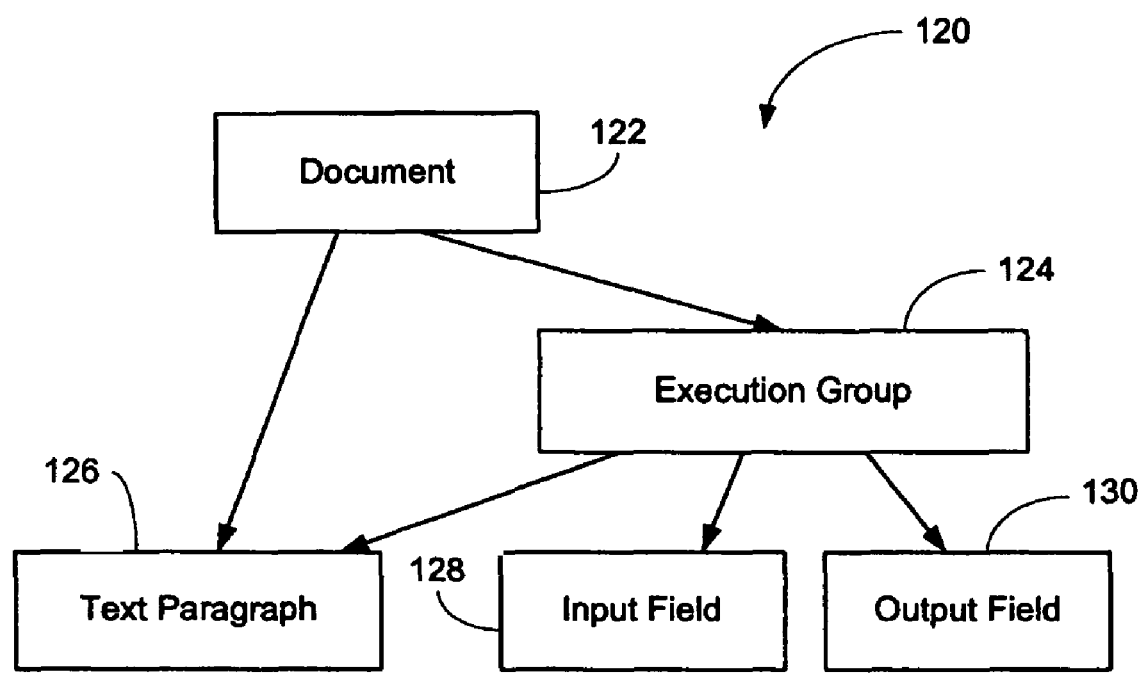
FIG. 3 shows in a diagram an example of a document hierarchy, in accordance with an embodiment of the mathematical document system.

FIG. 3 shows in a diagram an example of a document hierarchy 120, in accordance with an embodiment of the mathematical document system 100. The document hierarchy 120 comprises a document node 122, an execution group node 124, a text paragraph node 126, an input field node 128 and an output field node 130. The input field noted 128 and the output field node 130 include content such as a mathematical expression and display markup to indicate that the content is to be displayed as hidden or visible, and/or inline with text or on line by itself.

A document is presented to the user in one of two modes: Worksheet Mode or Document Mode. In Worksheet Mode, Text paragraphs are displayed with the content that they contain. Each Input Field 128 within an Execution Group 124 is displayed on a new line, optionally preceded by a prompt symbol (e.g., ">"). Each Output Field 130 within an Execution Group 124 is displayed on a new line, optionally centered.

Figure 4:
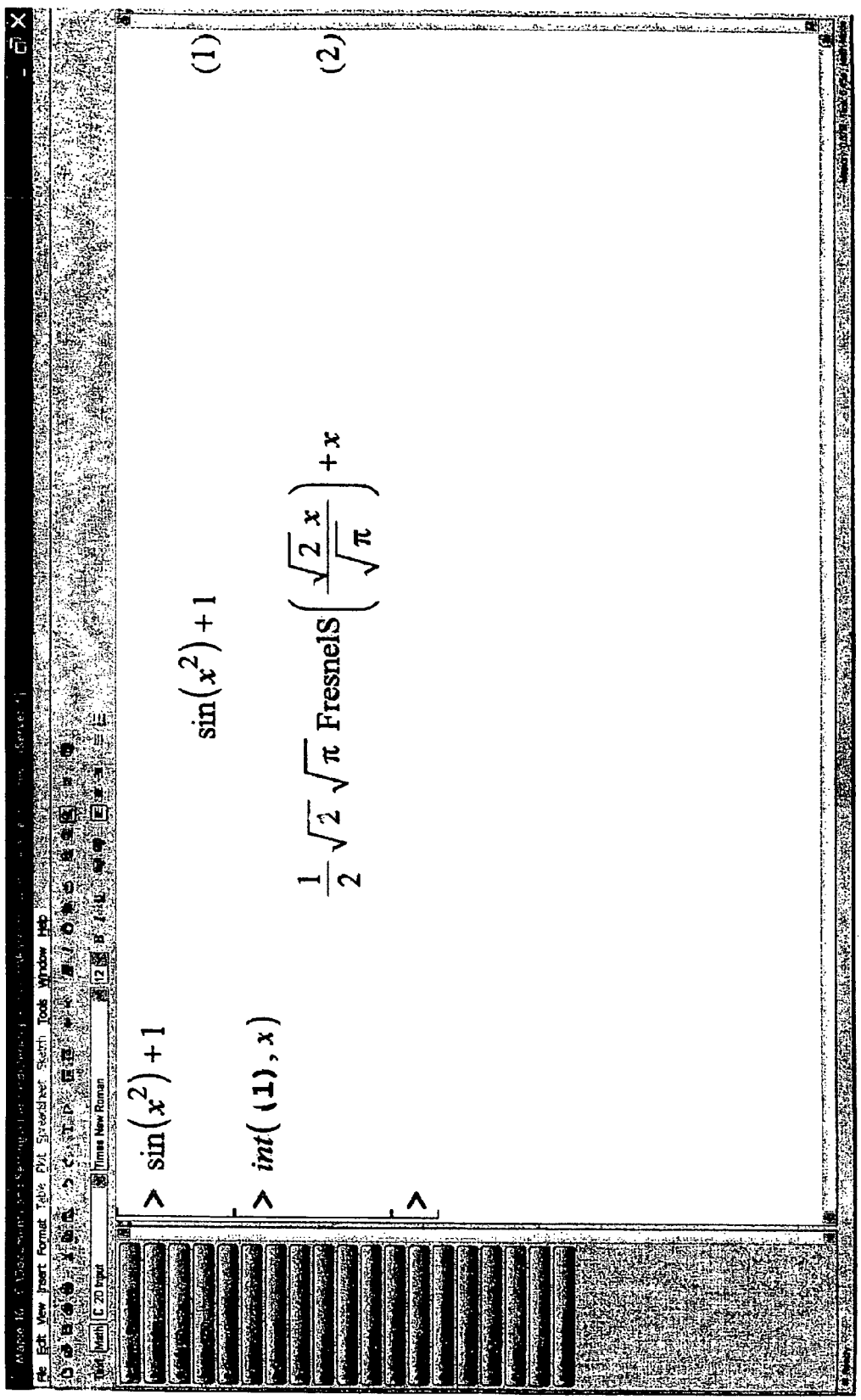
FIG. 4 shows in a screen shot an example of a mathematical document in Worksheet Mode, in accordance with an embodiment of the mathematical document system.

FIG. 4 shows in a screen shot an example of a mathematical document in Worksheet Mode, in accordance with an embodiment of the mathematical document system 100. A mathematical expression was created using the system (1). Subsequently a textual command (int((1),x)), referring to a particular mathematical operation, was inserted into the document. Execution of this command yielded a result, which is displayed as (2).

Figure 5:
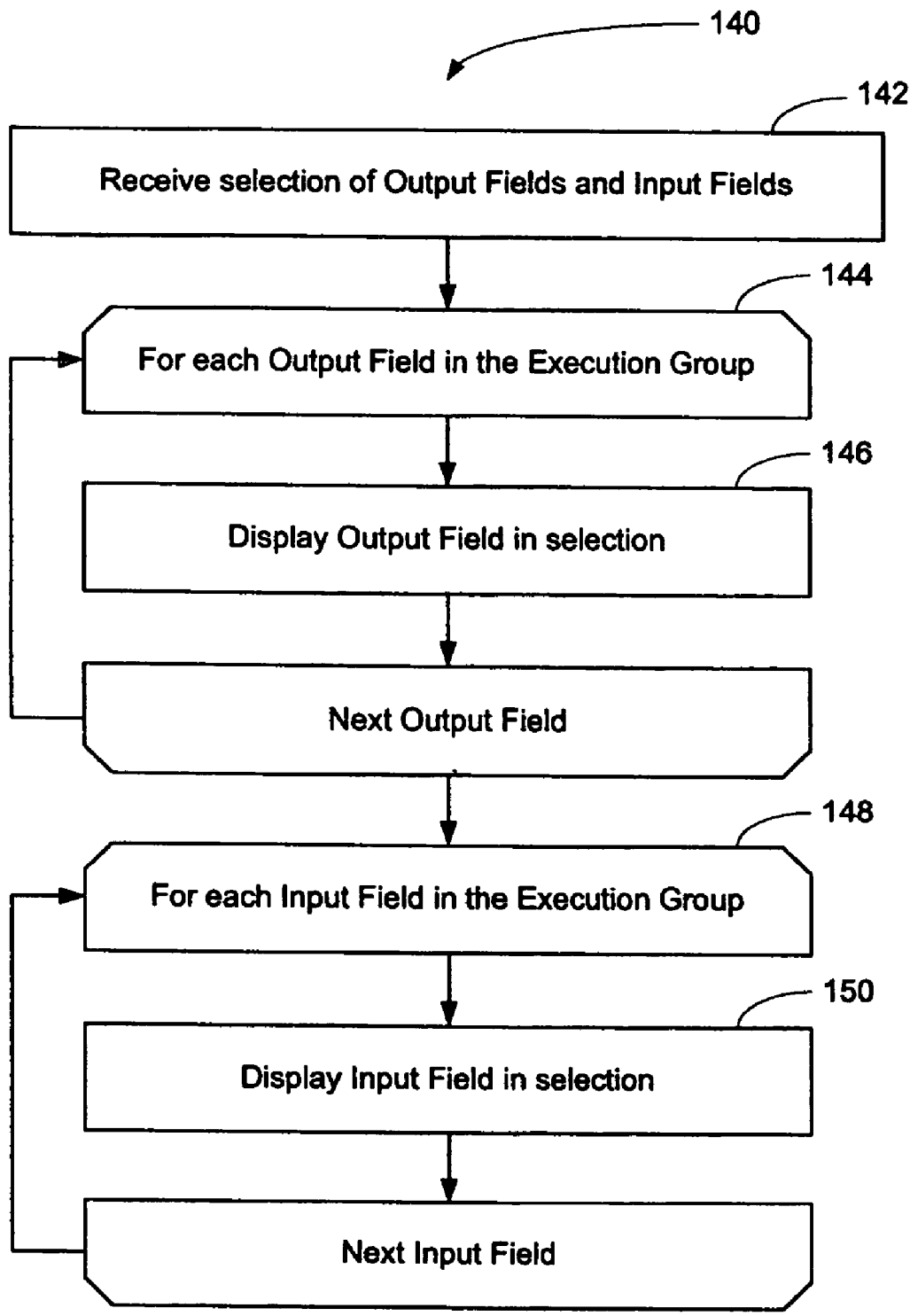
FIG. 5 shows in a flowchart an example of a method of displaying a mathematical document in document mode, in accordance with an embodiment of the mathematical document system.

In Document Mode, Text Paragraphs 126 are displayed as in Worksheet Mode and for each Execution Group 124, a user may choose a display of the document 122. FIG. 5 shows in a flowchart an example of a method of displaying a mathematical document in document mode (140), in accordance with an embodiment of the mathematical document system 100. A selection of Output Fields 130 and a selection of Input Fields 128 are received as an input (142). For each Execution Group 124 (144), each Output Field 130 of the selection is displayed on a new line (146). None of the other Output Fields 130 (i.e., not in the selection) in that Execution Group 124 are displayed. Next, for each Execution Group 124 (148), each Input Field 128 is displayed on a new line (150). None of the other Input Fields 128 (i.e., not in the selection) in that Execution Group 124 are displayed. Preferably, each visible Input Field 128 or Output Field 130 in an Execution Group 124 is displayed on a new line, optionally centered.

Figure 6:
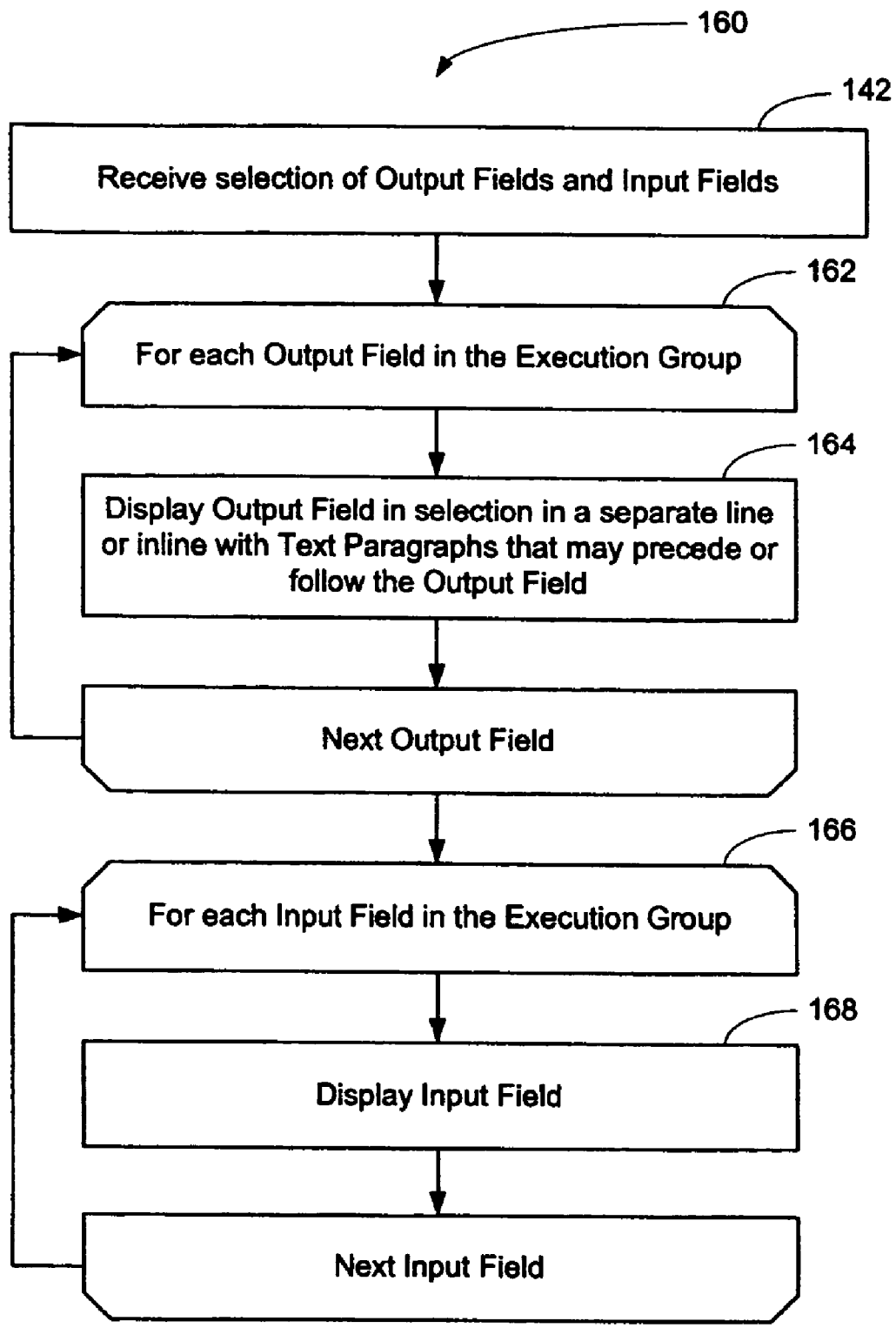
FIG. 6 shows in a flowchart another example of a method of displaying a mathematical document in document mode, in accordance with an embodiment of the mathematical document system.

FIG. 6 shows in a flowchart another example of a method of displaying a mathematical document in document mode (160), in accordance with an embodiment of the mathematical document system 100. A selection of Output Fields 130 and a selection of Input Fields 128 are received as an input (142). For each Execution Group 124 (162), each Output Field 130 of the selection is displayed in a separate line or inline with any Text Paragraphs 126 that may precede or follow the Output Field 130 (164). None of the other Output Fields 130 (i.e., not in the selection) in that Execution Group 124 are displayed. Next, for each Execution Group 124 (166), each Input Field 128 is displayed (168). None of the other Input Fields 128 (i.e., not in the selection) in that Execution Group 124 are displayed. The result is that the contents of the Output Field 130 can appear on the same line with surrounding text. Preferably, no space is inserted between the text and the contents of the Output Field 130. If spacing is desired, this spacing is explicitly inserted into the surrounding text.

Figure 7:
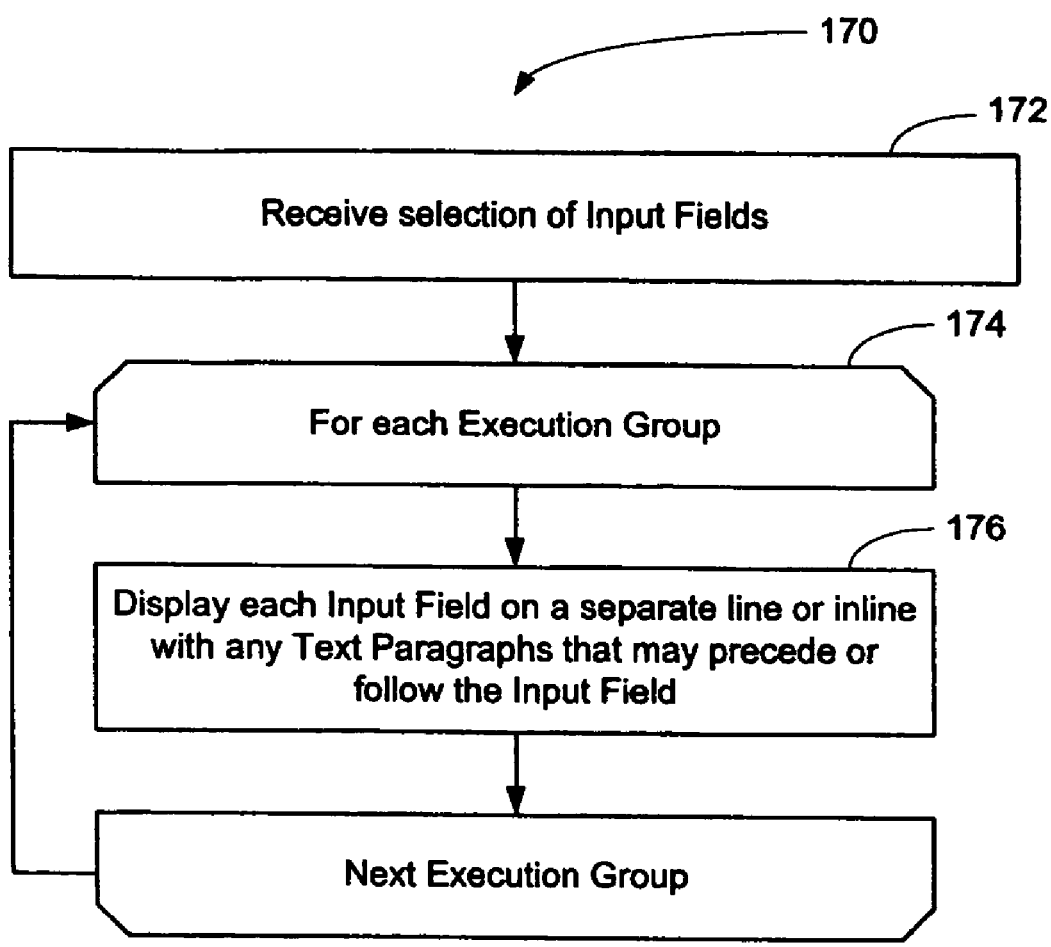
FIG. 7 shows in a flowchart another example of a method of displaying a mathematical document in document mode, in accordance with an embodiment of the mathematical document system.

FIG. 7 shows in a flowchart another example of a method of displaying a mathematical document in document mode (170), in accordance with an embodiment of the mathematical document system 100. A selection of Input Fields 128 are received as an input (172). For each Execution Group 130, each Input Field 128 are displayed on a separate line or may be displayed inline with any Text Paragraphs 128 that may precede or follow the Input Field 128 (174). None of the other Input Fields 128 (i.e., not in the selection) in that Execution Group 124 are displayed. None of the Output Fields 130 in that Execution Group 124 are displayed. The result is that the contents of the Input Fields 128 can appear on the same line with surrounding text and other Input Fields 128. No space is inserted between the text and the contents of the Input Field 128 or between Input Fields 128. If spacing is desired, this spacing is explicitly inserted into the surrounding text.

Figure 8:
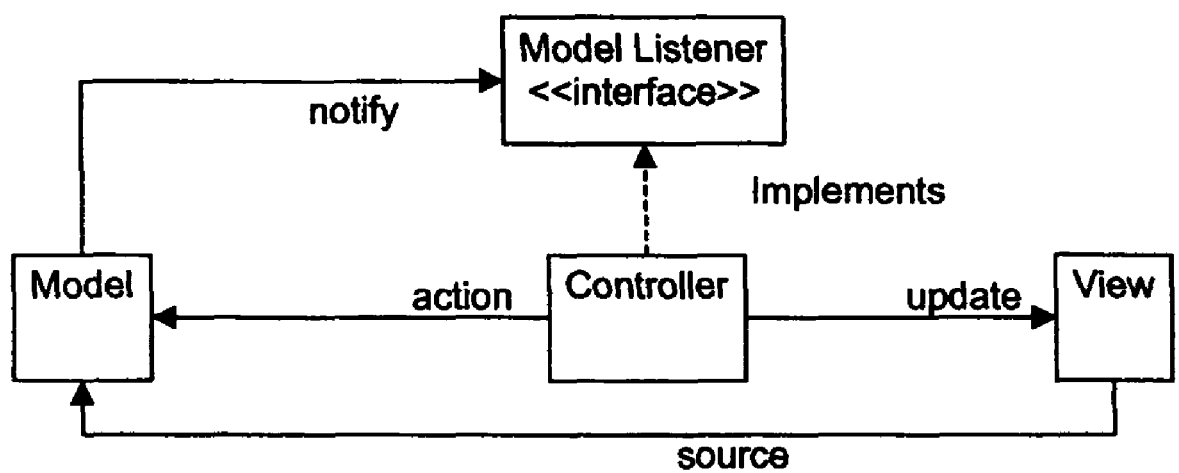
FIG. 8 shows in a Model-View-Controller framework diagram an example of a stratification of a document structure, in accordance with an embodiment of the mathematical document system.

Regardless of whether mathematical evaluations are visible or hidden, they are still expressed in the structure of the document. This is made possible by using a Model-View-Controller (MVC) framework to separate the document's "data" from its visual representation. This stratification of the document structure 180 is shown in FIG. 8. The user interacts with a document via its controller 182. Actions performed on the document modify its structure (i.e., modify the model 184), which in turn notifies the controller 182 (which implements a model listener interface 186) that the visual appearance may have changed. The view structure 188 is automatically updated in response to notifications.

Figure 9:
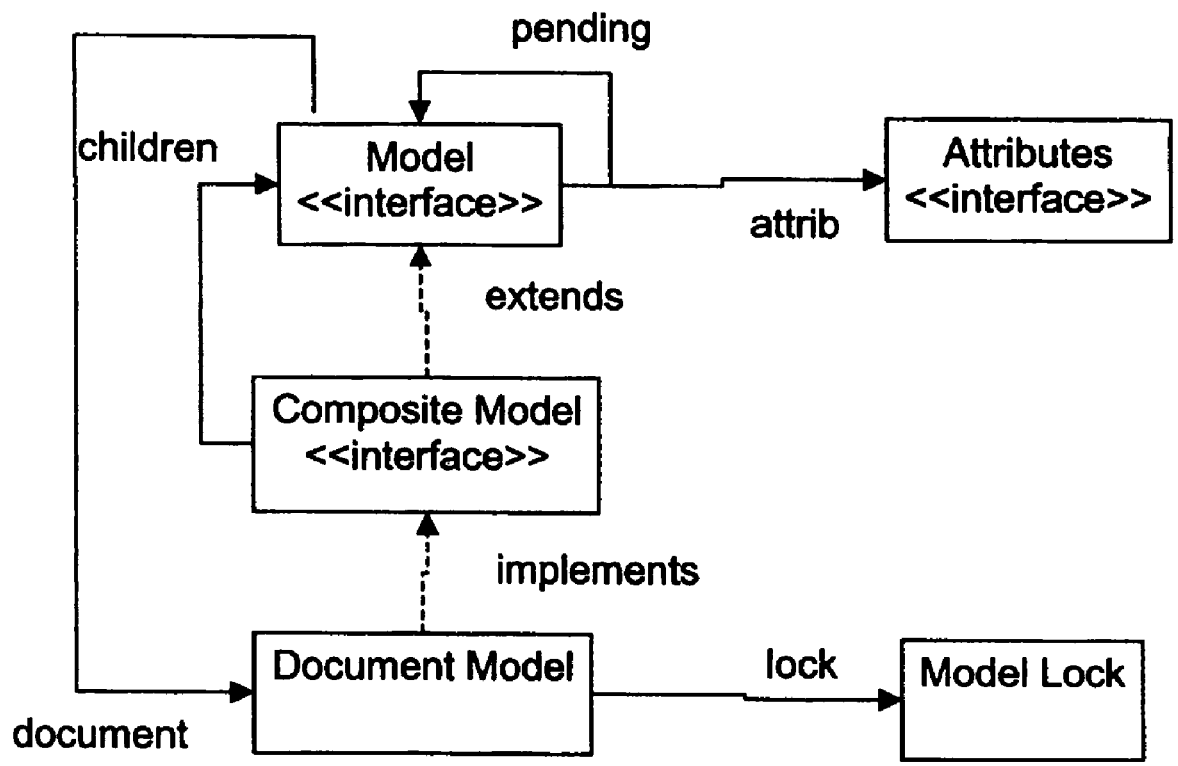
FIG. 9 shows a hierarchal structure of a typical model in the MVC framework.

FIG. 9 shows a hierarchal structure of a typical model in the MVC framework (190). Each model may be broken down into submodels, and is linked to the top level model to facilitate synchronization locking of the document. Furthermore, each model contains attributes that may affect the visual appearance of the model, and which may store metadata information to enable association between models.

Figure 11:
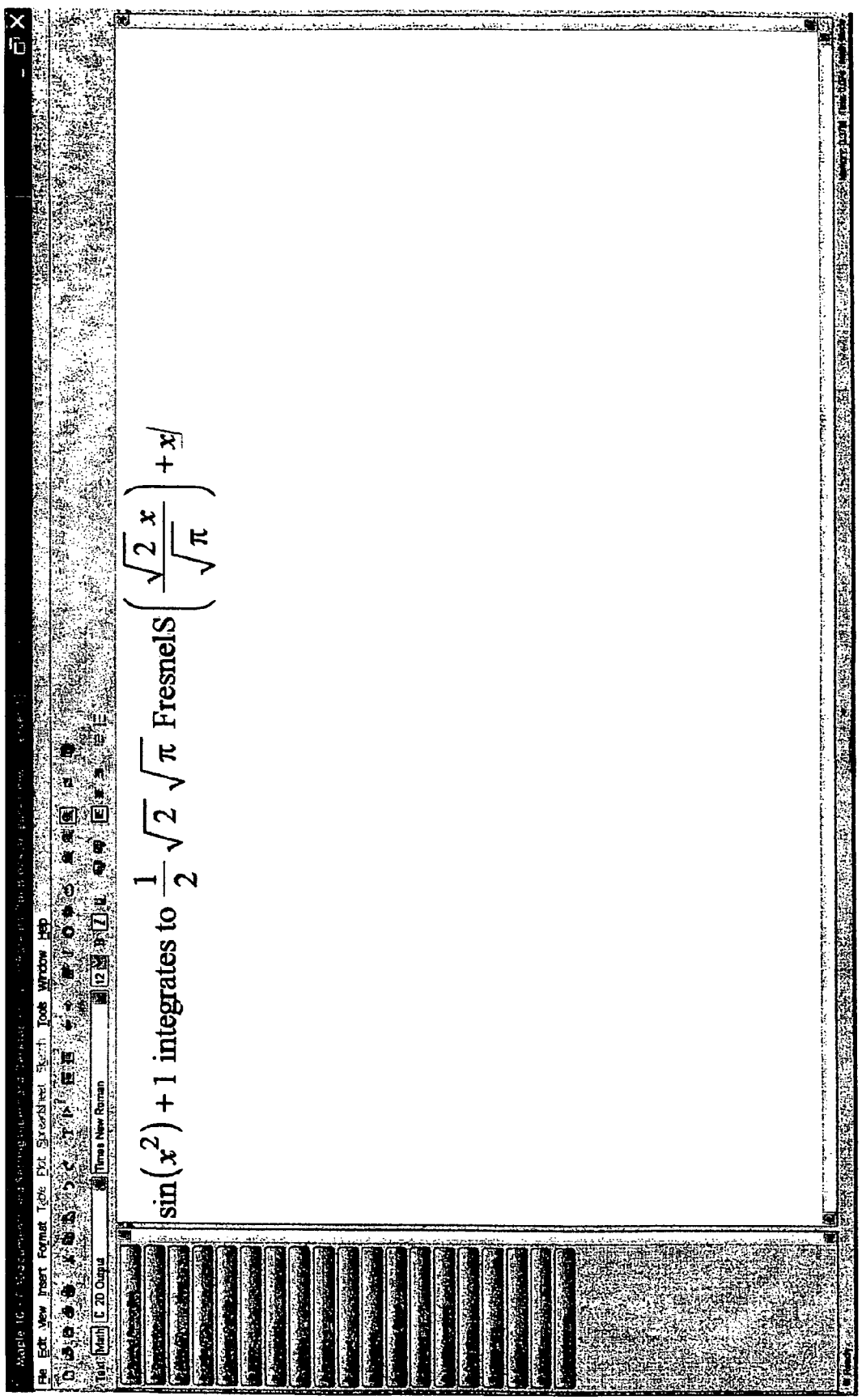
FIG. 11 shows in a screen shot the same document as in FIG. 10 that is displayed in an alternate mode, showing only the mathematical expressions and any descriptive text, and not the detail of the textual command describing the operation that was applied.

At any time, the user can toggle between viewing a document in Worksheet Mode or in Document Mode by selecting from a menu or pressing a hot key, or any other selection means. The controller will receive this request and perform an action on the model as in FIG. 8 and update the display. Typically, Document Mode will be used to hide all the commands that specify which mathematical operation is being applied to an input expression in order to get the resulting output and to focus the document on presenting the intermediate and final results of working through a problem. Typically, Worksheet Mode will be used to expose all the commands and display the precise semantics of what operation is being applied for each of the computations. FIG. 11 shows an example of a document in Document Mode.

In addition to the linear description above, optionally two-dimensional tables and collapsible sections can be used to further structure the document. The behaviour within such a structure will follow the description above.

Within a mathematical document, a user can perform an action (for example, pointing the mouse at a mathematical expression and clicking the right button) that will cause the display of a list of available operations for a particular mathematical expression. This list may be static or it may be constructed based on the nature of the expression. Alternatively, an operation can be selected by pressing a key or key combination or by clicking on a control. On selecting an expression, the corresponding textual command representing this operation will be inserted into a new Input Field in the document, the operation will be executed using a mathematical computation engine and the result of this computation will be inserted into a new Output Field. If such an action occurs in Document Mode, the textual command will by default be hidden, such that only the input expression as well as the output expression is visible. In addition, a Text Paragraph is inserted with a textual description of the operation performed. The detail of this description can vary from a simple equal sign or an arrow symbol to an arrow symbol with a stacked piece of text further describing the operation. In general, the description can be composed of arbitrary text and mathematical expressions, arranged in a two-dimensional fashion. The result of such an action is shown in FIG. 11. It is important to note that the exact textual command is preserved, even though it is not displayed by default and that it can be made visible at any time by the user by toggling to Worksheet Mode.

An Output Field can optionally be associated with an Equation Label, which can be displayed as an equation number next to a mathematical expression. Such equation numbers are pervasive in mathematical text books and this allows the mathematical document to more closely resemble such a text book. FIG. 4 shows two Equation Labels, (1) and (2). Equation Labels are automatically numbered using a user-defined numbering scheme that may reflect the structure of the document. For example, the Equation Labels can be numbered with consecutive integers starting at one for the first Output Field in the document. An Equation Label can be referenced from any point in the mathematical document in order to refer to the mathematical expression that is associated with the Equation Label. In particular, a reference to an Equation Label can be inserted at any point in an Input Field in order to reuse a mathematical expression that occurs elsewhere in the document.

The mechanism that automatically inserts textual commands based on a selection from a list of operations, described above, can optionally take advantage of Equation Labels in order to refer to the input expression within the generated textual command. This ensures that, if the input expression is modified at any later moment, the textual command can be applied to the new input expression automatically and thus user changes of input in the document can update output expressions as appropriate. This process is also shown in the transition from FIG. 11 to FIG. 12. Preferably, only Equation Labels that are displayed based on the current setting of Worksheet Mode or Document Mode, will be considered in the numbering scheme. Output Fields that are not being displayed can still have Equation Labels and such Equation Labels can still be referred to from other parts of the document, without restrictions, even though these Equation Labels will not have equation numbers. This is because in addition to an equation number, each Equation Label also stores a label that uniquely identifies this Equation Label. When a reference to an Equation Label is inserted into the document, the user specifies the equation number. Based on this equation number and the current numbering scheme, the label for the corresponding Equation Label is looked up and used for the reference that will be inserted. This ensures that references remain consistent if Output Fields are inserted into the document (causing a, possibly partial, renumbering of the Equation Labels) and that references also remain consistent if Output Fields are no longer displayed due to a switch from Worksheet Mode to Document Mode or due to a change in the display options in Document Mode, causing an Output Field's Equation Label to no longer have an equation number.

Figure 10:
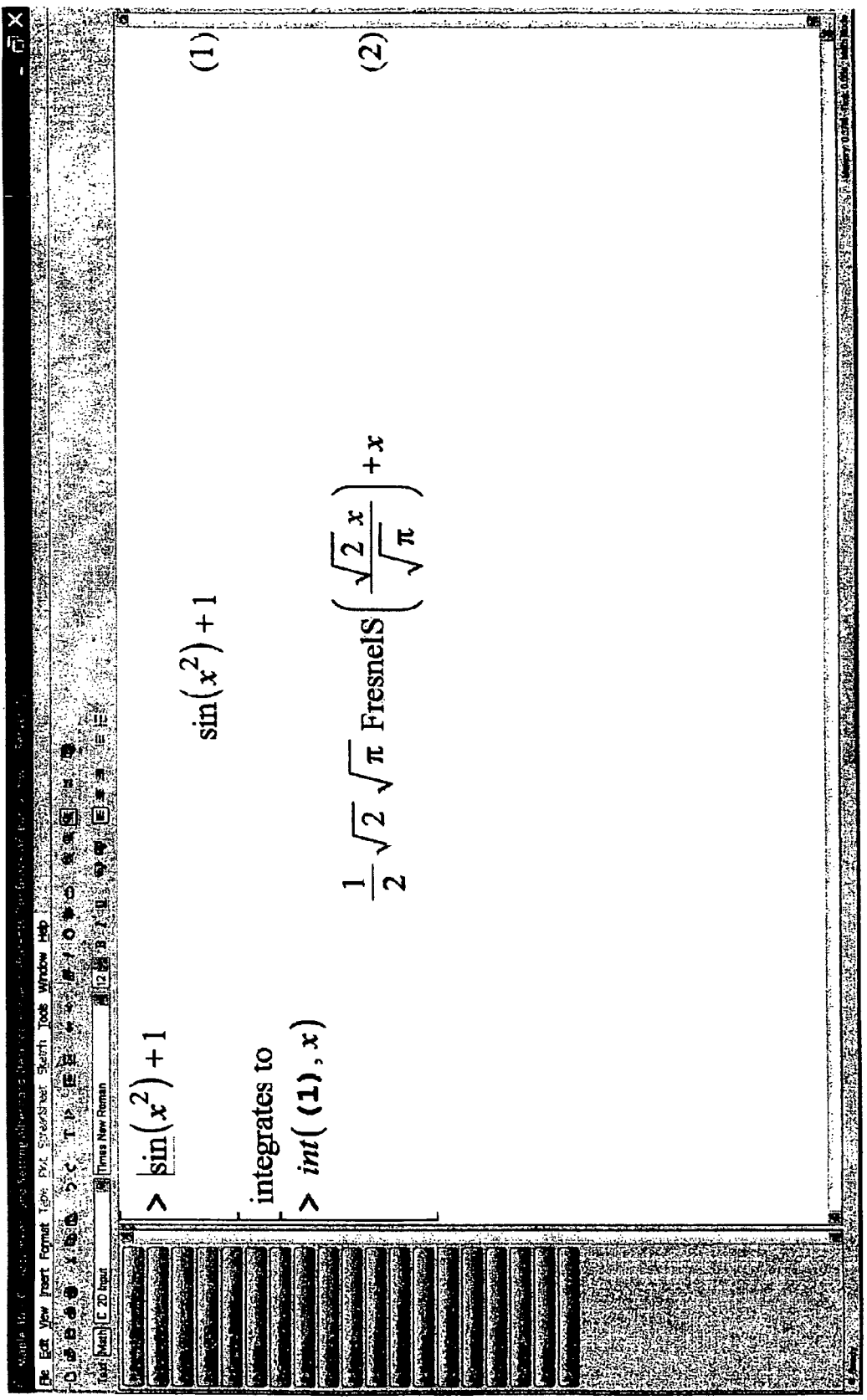
FIG. 10 shows in a screen shot the same document as in FIG. 4 that was modified to display the text "integrates to" between the input expression and the textual command representing the operation being applied.
Figure 12:
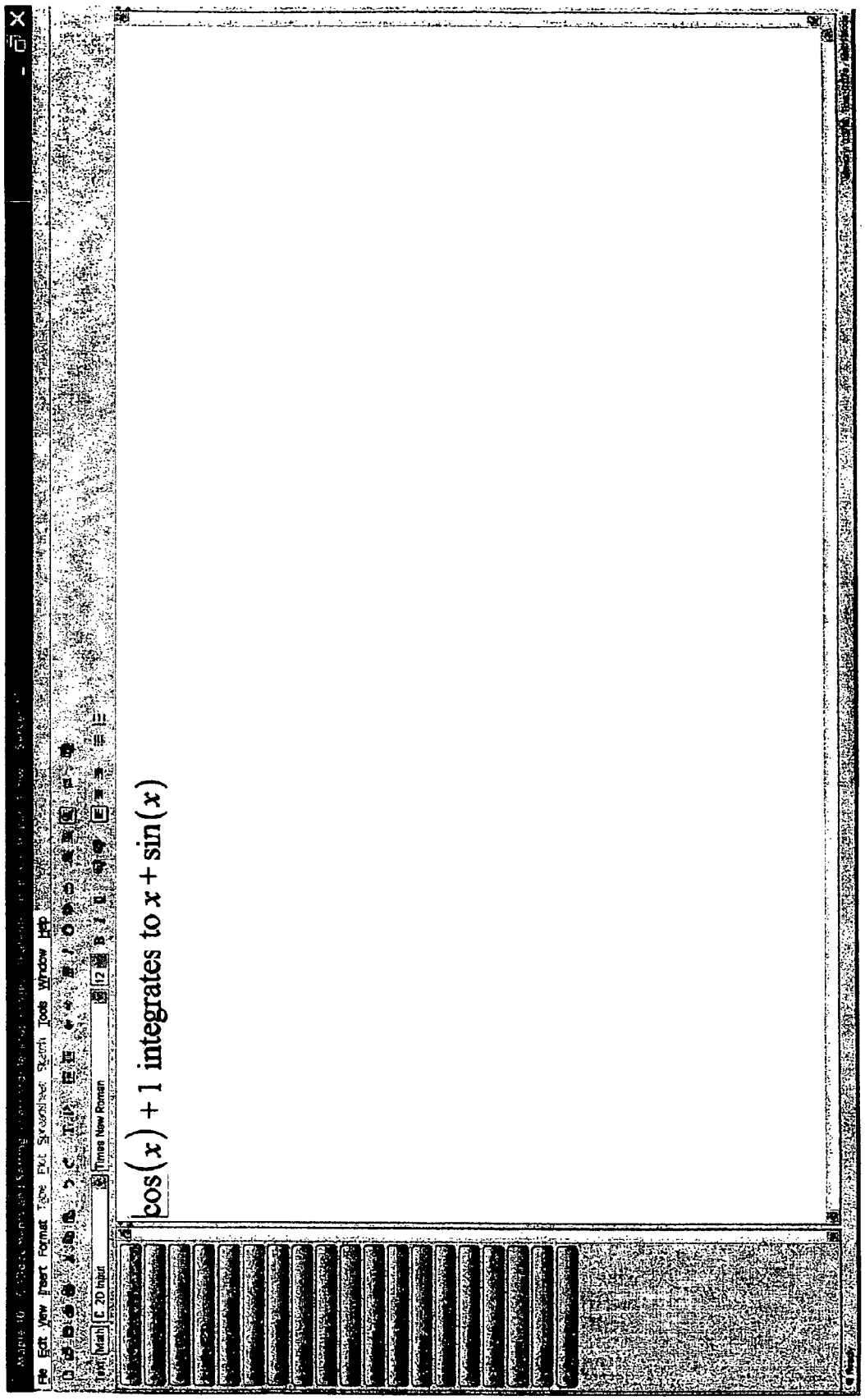
FIG. 12 shows in a screen shot the same document as in FIG. 11 wherein the input expression was modified.
Figure 13:
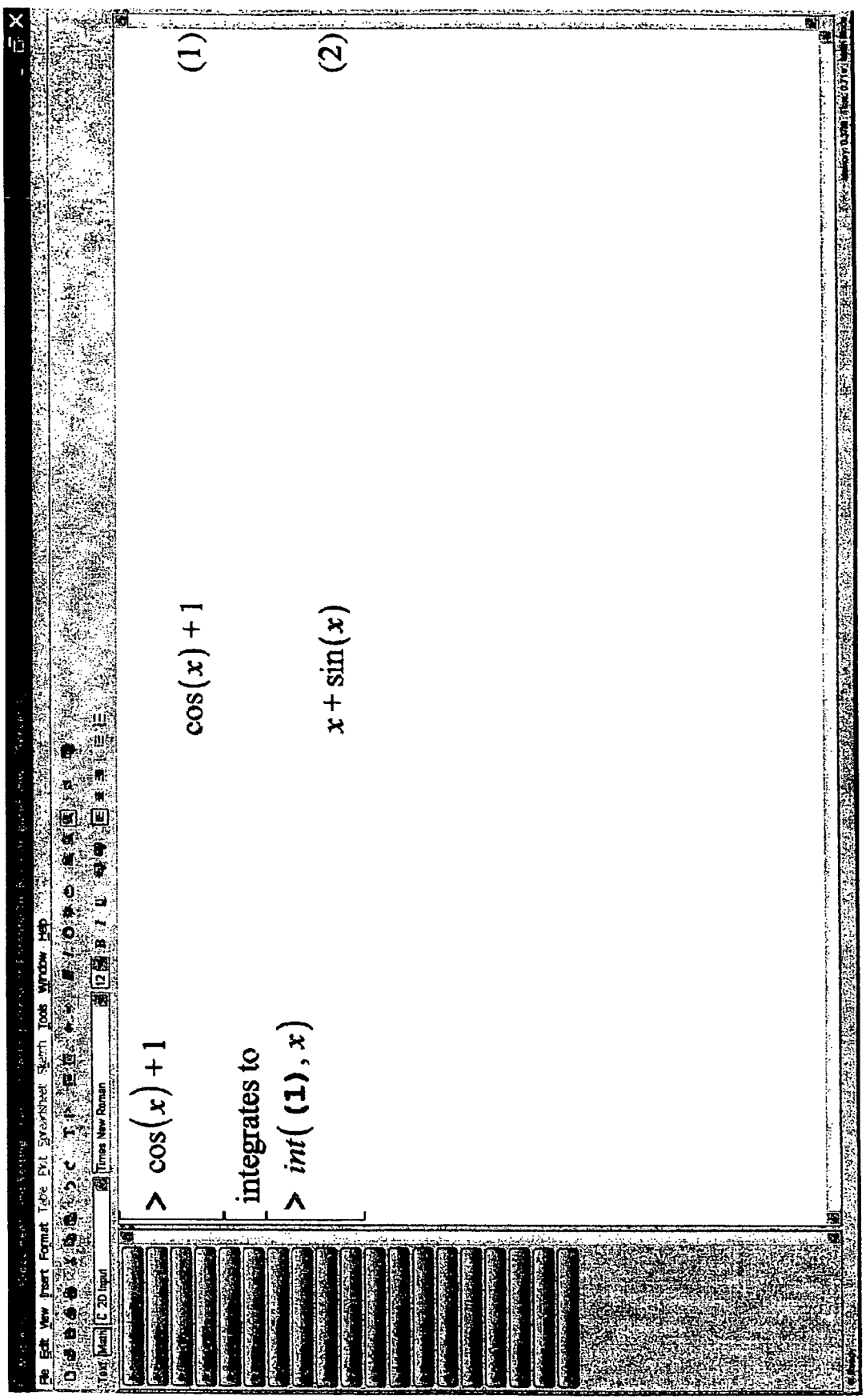
FIG. 13 shows in a screen shot the same document as in FIG. 12 displayed in the mode shown in FIGS. 4 and 10, illustrating a toggle between these two modes of display.

FIG. 10 shows in a screen shot the same document as in FIG. 4 that was modified to display the text "integrates to" between the input expression and the textual command representing the operation being applied. FIG. 11 shows in a screen shot the same document as in FIG. 10 that is displayed in an alternate mode, showing only the mathematical expressions and any descriptive text, and not the detail of the textual command describing the operation that was applied. FIG. 12 shows in a screen shot the same document as in FIG. 11 wherein the input expression was modified. In response to a user request, the result expression was updated to reflect the change in the input. FIG. 13 shows in a screen shot the same document as in FIG. 12 displayed in the mode shown in FIGS. 4 and 10, illustrating that it is possible to toggle between these two modes of display.

Figure 14:
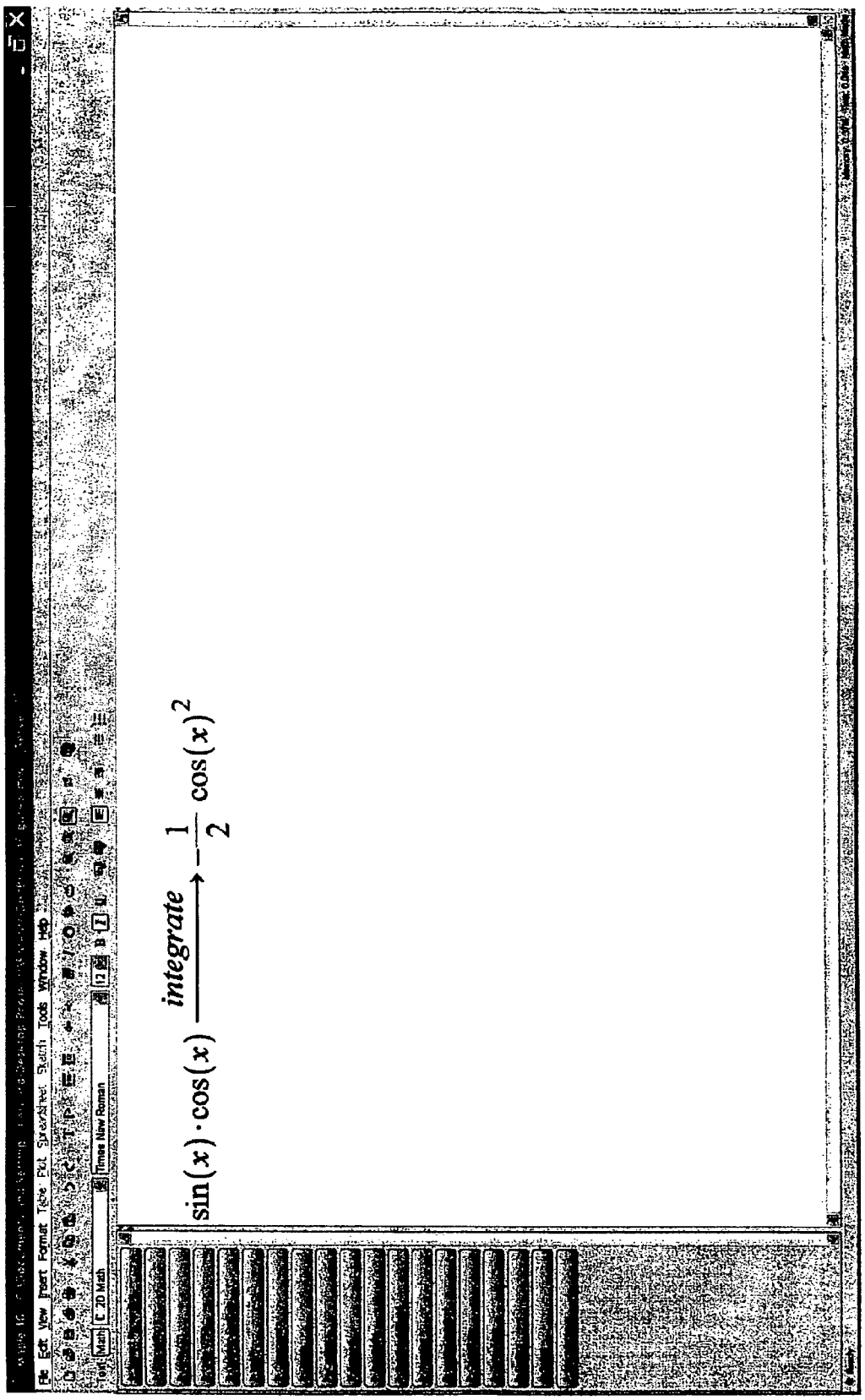
FIG. 14 shows in a screen shot another example of a document, which was created by entering an input expression and selecting a mathematical operation from a list in a menu.
Figure 15:
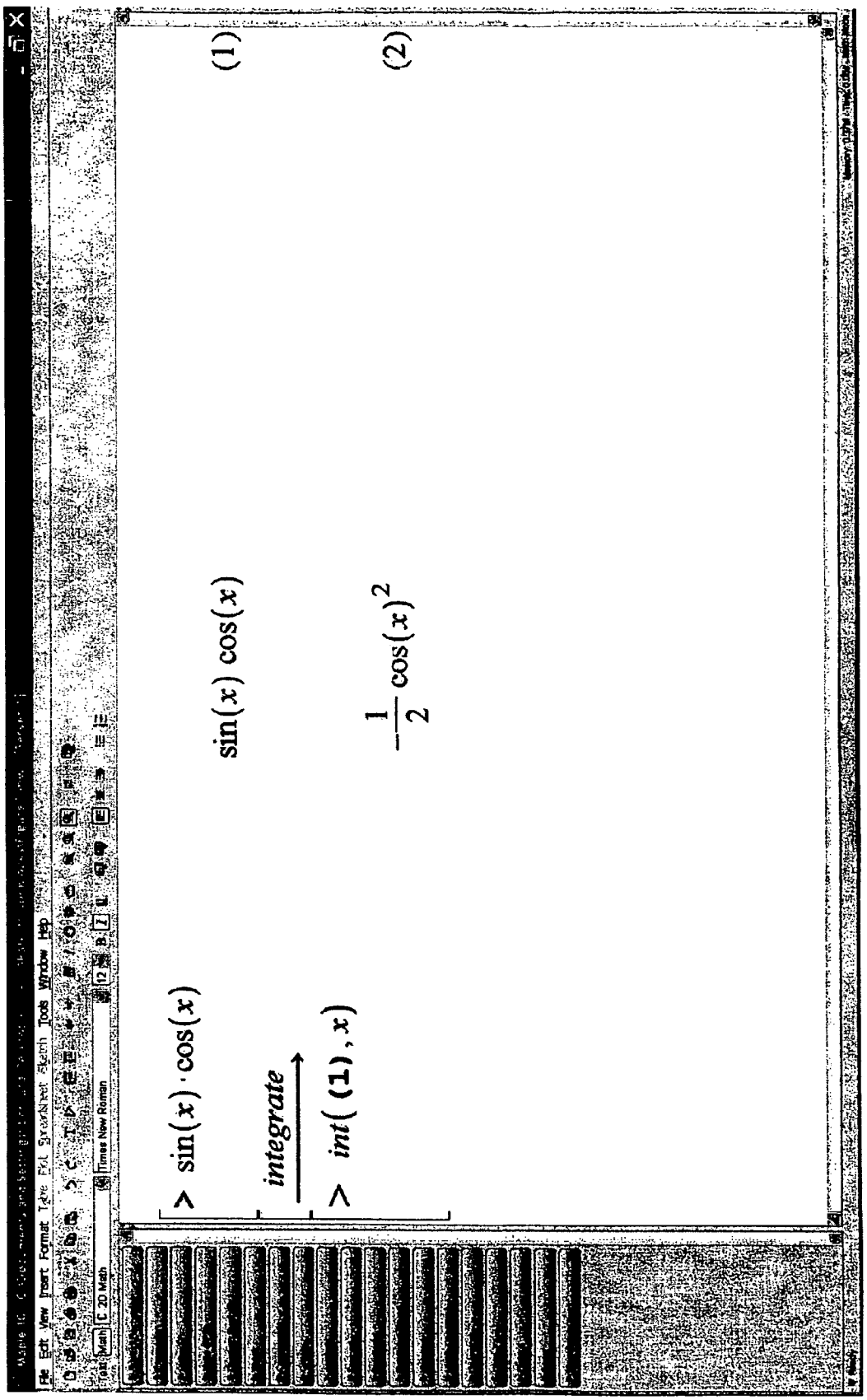
FIG. 15 shows in a screen shot the same document as in FIG. 14 displayed using an alternate mode, showing that the textual command that connects input and output expressions.

FIG. 14 shows in a screen shot another example of a document, which was created by entering an input expression and selecting a mathematical operation from a list in a menu. The result of the operation is displayed and in between input and result automatically appears a textual description of the operation that was performed (an arrow with the text "integrate" above it). FIG. 15 shows in a screen shot the same document as in FIG. 14 displayed using an alternate mode, showing that the textual command that connects input and output expressions and thus the full semantics of the operation is available to a user by toggling between the two modes of display.

The systems and methods according to the present invention may be implemented by any hardware, software or a combination of hardware and software having the above described functions. The software code, either in its entirety or a part thereof, may be stored in a computer readable memory. Further, a computer data signal representing the software code which may be embedded in a carrier wave may be transmitted via a communication network. Such a computer readable memory and a computer data signal are also within the scope of the present invention, as well as the hardware, software and the combination thereof.

While particular embodiments of the present invention have been shown and described, changes and modifications may be made to such embodiments without departing from the true scope of the invention.

What is claimed is:

1. A system for creating and presenting mathematical documents, the system comprising:
   an input/output component for receiving input data and displaying a mathematical document, created and formatted in response to the input data;
   a document repository for storing the mathematical document including markup that specifies at least one input field, at least one output field and display options;
   one or more equation labels, each equation label associated with a respective output field of the at least one output field, each of the one or more equation labels comprising a display label for displaying when the output field is displayed, and a label identifier for uniquely referring to the output field within the mathematical document;
   a controller for controlling display of the mathematical document including hiding a subset of the at least one input field and the at least one output field, displaying the remaining input and output fields, and re-labeling the display label of all the displayed output fields when the subset of output fields displayed changes;
   a mathematical engine for performing mathematical computations based on the displayed subset of the at least one input field and the at least one output field of the mathematical document.

2. The system for creating and presenting mathematical documents as claimed in claim 1, wherein the input/output component includes a display as well as a keyboard and point device that allows a user to input characters, symbols and mathematical operations as well as initiate manipulations of the mathematical document.

3. The system as claimed in claim 1, wherein:
   each of the at least one input field comprises mathematical expressions representing a mathematical expression or an operation or algorithm to perform; and
   each of the at least one output field comprises mathematical expressions.

4. The system as claimed in claim 3, further comprising at least one execution group in the mathematical document for grouping a plurality of input and output fields together.

5. The system as claimed in claim 1, wherein the display label comprises a number, and the controller re-labels the display label of all the display output fields consecutively.

6. A method of creating and presenting mathematical documents, the method comprising the steps of:
   receiving input data that represent characters, symbols and mathematical operations as well as manipulations and presentation control of a mathematical document, the mathematical document including markup that specifies at least one input field and at least one output field associated with an equation label, which can be used elsewhere in the mathematical document to refer to one or more mathematical expressions corresponding to associated output, wherein the equation label comprises a display label for displaying with the output field and a label identifier for uniquely referring to the output field within the mathematical document;
   displaying one or more of the at least one input field and at least one output field comprising the one or more mathematical expressions or a combination of the one or more mathematical expressions and text;
   performing computations based on the one or more mathematical expressions of the displayed input and output fields of the mathematical document;
   controlling the display of the input and output fields of the mathematical document, including hiding or displaying a subset of the at least one input field and a subset of the at least one output field and re-labeling the display label of all the displayed output fields when the output fields displayed changes.

7. The method as claimed in claim 6, wherein the step of controlling the display of the input and output fields further controls whether the input and output fields appear inline, within surrounding text or on a separate line.

8. The method as claimed in claim 6, wherein any portion of the mathematical document is displayed by any one of:
   displaying a selection of the one or more mathematical expressions in that portion of the mathematical document, hiding the remaining ones;
   displaying the one or more mathematical expressions inline, on the same line with the surrounding text and symbols;
   displaying the mathematical expressions each on a separate line;
   displaying full textual commands that specify what operation is applied to transform one mathematical expression to another one; and hiding the full textual command that specifies what operation is applied to transform one mathematical expression to another one.

9. The method as claimed in claim 8, further comprising the step of allowing a user to select an operation to perform from a list of available operations or by pressing a key or key combination, where the result is displayed following the input expression, such that the user can toggle between exposing or not exposing the textual command that was implied by the operation selected from the list.

10. The method as claimed in claim 9, further comprising the step of automatically inserting a descriptive text or symbol between the input and output expressions.

11. The method as claimed in claim 9, further comprising the step of automatically inserting a symbol with a text above it that describes the operation that was performed.

12. The method as claimed in claim 11, with the symbol being an equal sign.

13. The method as claimed in claim 11, with the symbol being an arrow.

14. The method of claim 6, wherein re-labeling the display labels comprises:
  assigning consecutive numbers to each of the output fields displayed according to an order they appear in the mathematical document.

\* \* \* \* \*